United States Patent
Tilwani et al.

(10) Patent No.: US 9,767,431 B2
(45) Date of Patent: *Sep. 19, 2017

(54) VIRTUAL PRODUCT HIERARCHIES

(71) Applicant: Information Resources, Inc., Chicago, IL (US)

(72) Inventors: Prakash Tilwani, Chicago, IL (US); Robert E. Potter, II, Elmhurst, IL (US); Sheila J. Noojibail, Evanston, IL (US)

(73) Assignee: Information Resources, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/138,453

(22) Filed: Dec. 23, 2013

(65) Prior Publication Data

US 2015/0154312 A1 Jun. 4, 2015

Related U.S. Application Data

(63) Continuation of application No. 14/093,950, filed on Dec. 2, 2013.

(51) Int. Cl.
*G06F 17/30* (2006.01)
*G06Q 10/08* (2012.01)

(52) U.S. Cl.
CPC .................. *G06Q 10/087* (2013.01)

(58) Field of Classification Search
None
See application file for complete search history.

(56) References Cited

U.S. PATENT DOCUMENTS

| | | | |
|---|---|---|---|
| 7,376,641 B2 * | 5/2008 | Chang et al. | 707/708 |
| 9,047,124 B2 * | 6/2015 | Mehta et al. | |
| 2004/0111465 A1 * | 6/2004 | Chuang et al. | 709/203 |
| 2005/0076050 A1 * | 4/2005 | Wilcockson | 707/102 |
| 2005/0187976 A1 | 8/2005 | Goodman et al. | |
| 2007/0078840 A1 * | 4/2007 | Stern et al. | 707/4 |
| 2007/0089115 A1 * | 4/2007 | Stern et al. | 719/313 |
| 2011/0106850 A1 * | 5/2011 | Li et al. | 707/780 |
| 2011/0131178 A1 | 6/2011 | Kanellos | |
| 2011/0307839 A1 | 12/2011 | Liao et al. | |

(Continued)

OTHER PUBLICATIONS

USPTO, "U.S. Appl. No. 14/093,950, Non-Final Office Action mailed Mar. 26, 2015", 10 pages.

(Continued)

*Primary Examiner* — Fateh M Obaid

(74) *Attorney, Agent, or Firm* — Strategic Patents, P.C.

(57) ABSTRACT

A base hierarchy of products or the like can be user-modified into a virtual hierarchy that is represented as a collection of changes to the base hierarchy rather than a new hierarchy stored in memory. The collection of changes can be used to enable user interactions such as queries, displays, and writes using the virtual hierarchy as thought it were an actual hierarchy stored in memory, with aspects of the virtual hierarchy dynamically created using a collection of procedures based on the changes and corresponding inverses. The representation of the modified hierarchy can be dynamically displayed to a user or otherwise processed in the same manner as other hierarchies and hierarchical data.

14 Claims, 5 Drawing Sheets

(56) References Cited

U.S. PATENT DOCUMENTS

2014/0129342 A1 5/2014 Sanghavi et al.
2014/0258844 A1 9/2014 Liao et al.

OTHER PUBLICATIONS

USPTO, "U.S. Appl. No. 14/093,950, Final Office Action mailed Oct. 22, 2015", 14 pages.
USPTO, "U.S. Appl. No. 14/093,950, Non-Final Office Action mailed May 20, 2016", 10 pages.
USPTO, "U.S. Appl. No. 14/093,950, Final Office Action mailed Dec. 29, 2016", 13 pages.
USPTO, "U.S. Appl. No. 14/093,950, Non-Final Office Action dated May 22, 2017", 5 pages.

* cited by examiner

VIRTUAL PRODUCT HIERARCHIES

CROSS REFERENCE TO RELATED APPLICATIONS

This application is a continuation of U.S. patent application Ser. No. 14/093,950 filed Dec. 2, 2013, the entirety of which is hereby incorporated by reference herein.

BACKGROUND

Retailers, product manufacturers, or other commercial participants are often interested in hierarchies of products. Hierarchies can be organized in a variety of ways. For example, the inventory of a grocery store may include a category of beverages that contains sub-categories of sodas, flavored waters, juices, etc. Another grocery store with the same inventory may organize the beverage portion of its hierarchy differently. For example, the "beverage" category may contain sub-categories by manufacturer (e.g., COKE, PEPSI, etc.). Moreover, a chain of grocery stores may have a hierarchy that involves a high-level category related to store location, with lower-level categories involving product attributes, while yet another chain of grocery stores may have the reverse organization—high-level categories related to product attributes, with lower-level categories related to store location.

Hierarchies are useful to assist in performing analytic tasks. For example, a retailer or a product manufacturer may wish to assess the efficacy of a marketing campaign or the performance of a new line of products. Certain relevant analytic questions are often easier to formulate in the context of a hierarchy, such as examining sales of all products at a particular level in a hierarchy, or comparing performance of some aggregated products or brands to others.

Retailers, product manufacturers, or other commercial participants often have more than one hierarchy to describe the same collection of inventory. Moreover, as time progresses, it is often desirable to create new hierarchies (or modify existing hierarchies) to account for new products, new brands, new stores, new analytic questions, etc. Similarly, where data for different users are combined due to a sale or other change in a company, or where an existing product hierarchy is adapted to a new customer, various user-specific changes may be made without any need or desire to change the original hierarchy. Furthermore, the original hierarchy may have continuing utility to vendors or the like that supply data in a predetermined way to populate the hierarchy with data.

There remains a need for tools to permit end users to modify a hierarchy of information into a new hierarchy changing the underlying hierarchy from which the new hierarchy is derived.

SUMMARY

A base hierarchy of products or the like can be user-modified into a virtual hierarchy that is represented as a collection of changes to the base hierarchy rather than a new hierarchy stored in memory. The collection of changes can be used to enable user interactions such as queries, displays, and writes using the virtual hierarchy as thought it were an actual hierarchy stored in memory, with aspects of the virtual hierarchy dynamically created using a collection of procedures based on the changes and corresponding inverses. The representation of the modified hierarchy can be dynamically displayed to a user or otherwise processed in the same manner as other hierarchies and hierarchical data.

DESCRIPTION OF DRAWINGS

Embodiments of the invention described herein may be understood by reference to the following figures, which are provided by way of example and not of limitation.

DETAILED DESCRIPTION

Figure 1:
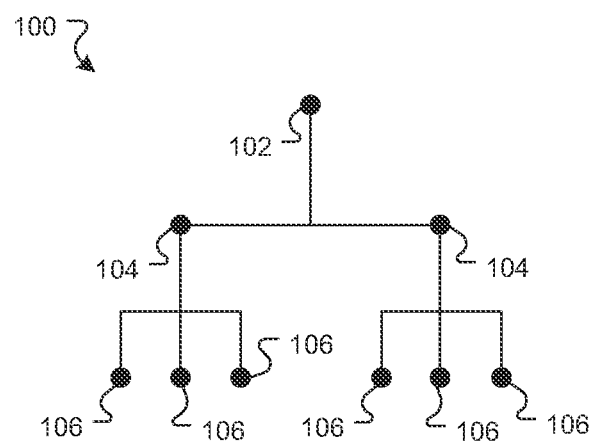
FIG. 1 is a schematic depiction of an exemplary product hierarchy.

FIG. 1 is a schematic depiction of an exemplary product hierarchy. The product hierarchy 100 includes a top level node 102, intermediate nodes 104, and bottom level nodes 106 (also called "leaf level" nodes 106). Although the hierarchy 100 shown in FIG. 1 is relatively small, in general a hierarchy can contain any number of nodes organized in any number of levels. For example, in some implementations the leaf level nodes 106 collectively describe every unique item for sale at a large retail chain, which in some cases can exceed 1.5 million items.

The intermediate nodes 104 describe product categories. For example, a category can (although need not) describe a collection of products that share a common attribute, such as a brand name. In another example, an intermediate node may represent all the beverages in an inventory, even if there are no attributes that all beverages have in common. Although only one level of intermediate nodes 104 is shown in FIG. 1, in general there can be any number of levels. These other levels correspond to sub-categories, sub-sub-categories, etc. For example, if an intermediate node 104 corresponds to beverages, then a lower level might correspond to carbonated beverages, an even lower level might correspond to sodas, a still lower level might correspond to diet sodas, etc. In some implementations, large product categories can have as many as 10 or more different levels.

The top level node 102 may represent the entire enterprise. For example, if the hierarchy 100 describes the inventory of a single store, then the node 102 may represent the entire inventory collectively. If the hierarchy 100 describes the inventory of a chain of stores, then the node 102 represents the entire chain. In some implementations, the top level node 102 is only implicit; that is, it is not explicitly described in the data setting forth the structure of the hierarchy.

The hierarchy 100 can be implemented in a variety of ways. For example, the hierarchy 100 can be expressed as a relational database (or portion of a relational database), as a tree, as a linked list, a flat file etc.

There is performance data associated with (but not necessarily part of) some nodes of the hierarchy. Performance data describes how that node has performed in the marketplace over a particular period of time. Performance data associated with leaf level nodes 106 describe how the corresponding products performed. Performance data for an intermediate node 104 describe how the lower-level components of that node collectively perform. For example, where an intermediate node 104 corresponds to a category of all DIET PEPSI flavored beverages, the performance data associated with that node 104 might collectively describe how the various package sizes (e.g., 2 liter bottles, six packs of 12 oz. cans, 20 oz. bottles, etc.) of DIET PEPSI beverages perform. In some implementations, performance data is only stored for leaf level nodes 106, and is dynamically computed as needed (e.g., as described below) for higher intermediate nodes 104.

In some implementations, performance data includes raw sales data (e.g., number of units sold, the price at which the units sold, whether there were discounts, whether the sale involved certain pre-defined characteristics, dollar sales, market share, etc.). In some implementations, performance data includes a percentage change in a performance characteristic compared to a previous time period (e.g., week-over-week percentage sale increase, percentage price increase, etc.)

Often, hierarchies are defined to facilitate analysis of performance data by marketing professionals, brand managers, manufacturers, etc. For example, if one were interested in how well PEPSI brand beverages perform vs. COKE brand beverages irrespective of other factors, then a hierarchy containing "PEPSI" and "COKE" nodes would facilitate such an analysis. Absent such nodes, one might have to manually assemble the relevant performance data—e.g., find performance data for 20 oz. bottles, six-pack cans, 2 liter bottles, etc., and manually aggregate such data. This can be difficult to assemble, particularly if the performance data involves non-additive measures, such as percentages or other relative measures.

For a variety of reasons, one may desire a new hierarchy beyond any pre-defined hierarchies that may exist. One reason is to facilitate a new type of analysis. For example, a marketing professional may wonder whether previously unexplored relationships may exist between various products. Under the marketing professional's new philosophy, all products that come in blue or green packages may be worthy of a category unto themselves, with products in orange packaging deserving a separate category, and then any other color packaging comprising a third category.

In a less extreme example, another reason for desiring a new hierarchy is to help analyze a new, disruptive product. For example, in the mid-2000's, the electronics market had two relatively well-defined products: smartphones and tablets. Smartphones were characterized, roughly, by their ability to make phone calls, and a screen size of approximately four inches or less. Similarly, tablets were characterized, roughly, by their inability to make phone calls and a screen size of eight inches or more.

In approximately 2010, devices that straddled both characterizations began to appear on the market. These devices had the ability to make phone calls, and had screen sizes between 5 and 6 inches. Various marketing professionals may want characterize such devices as smartphones, as tablets, or as an entirely new category of device. The latter option involves creating a new hierarchy to account for the new category.

It can be difficult to implement even small changes to existing categories. To preserve data integrity and mitigate errors, it can take several weeks to create a new product hierarchy or modify an existing hierarchy for large retail outlets—even if the new product hierarchy is relatively similar to a previously existing product hierarchy. The techniques described below allow a user to create a "virtual hierarchy," which can provide the benefits of creating a new hierarchy. However, the techniques below provide a further benefit that virtual hierarchies can be created and modified in real time, as opposed to the weeks involved in creating a new hierarchy.

Figure 2:
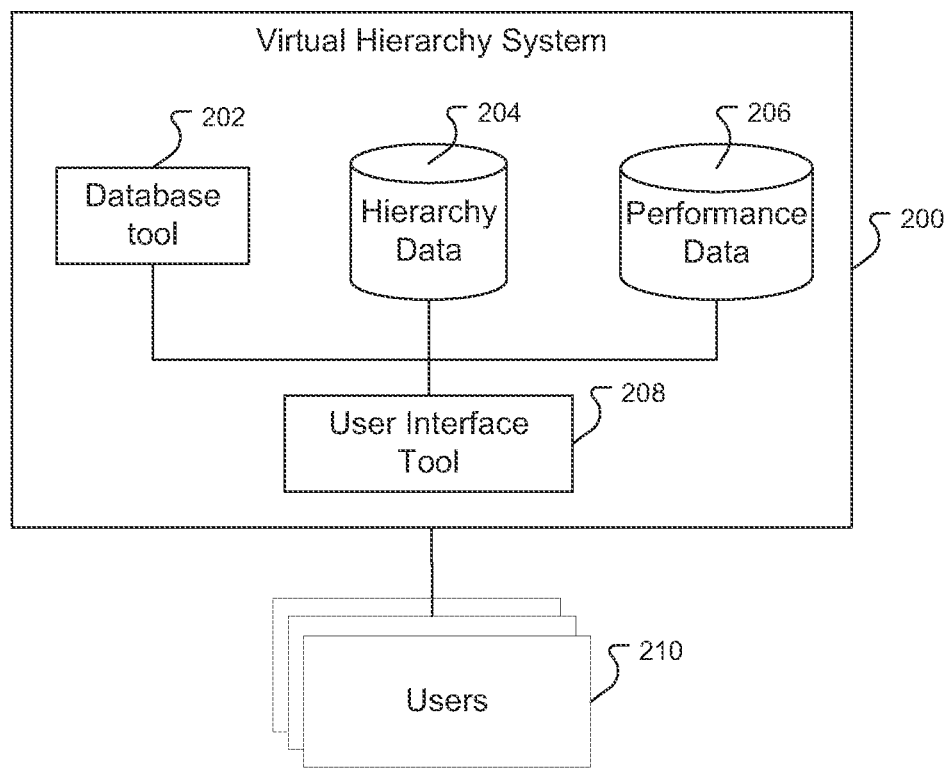
FIG. 2 is a block diagram of a hierarchy system.

FIG. 2 is a block diagram of a virtual hierarchy system. The virtual hierarchy system 200 includes a database tool 202, hierarchy data 204, performance data 206, and a user interface tool 208. The system 200 is in data communication with one or more users via any known communication channel, such as a local area network, ad hoc network, wide-area network such as the Internet, or via directly connected input/output devices such as keyboards, microphones, touchscreens, mice, audio speakers, monitors, etc.

The database tool 202 is operable to perform standard database tasks (e.g., processing queries) with respect to conventional (i.e., non-virtual) hierarchies and associated performance data. The database tool 202 is also operable to convert queries with respect to virtual hierarchies into queries with respect to corresponding conventional hierarchies, as described more fully below. In some implementations, the database tool 202 includes or interfaces with a database management system (DBMS).

The hierarchy data 204 includes definitions of one or more conventional product hierarchies, as well as change data (described below) associated with virtual hierarchies. The performance data 206 includes the performance data described above with respect to the products in the various hierarchies maintained in the system 200.

The user interface tool 208 is operable to provide an interface through which the user may interact with the virtual hierarchy system. In some implementations, the user interface may include a graphical user interface that allows a user to drag and drop nodes of an existing conventional or virtual hierarchy to other locations, thereby creating new virtual hierarchies.

Figure 3A:
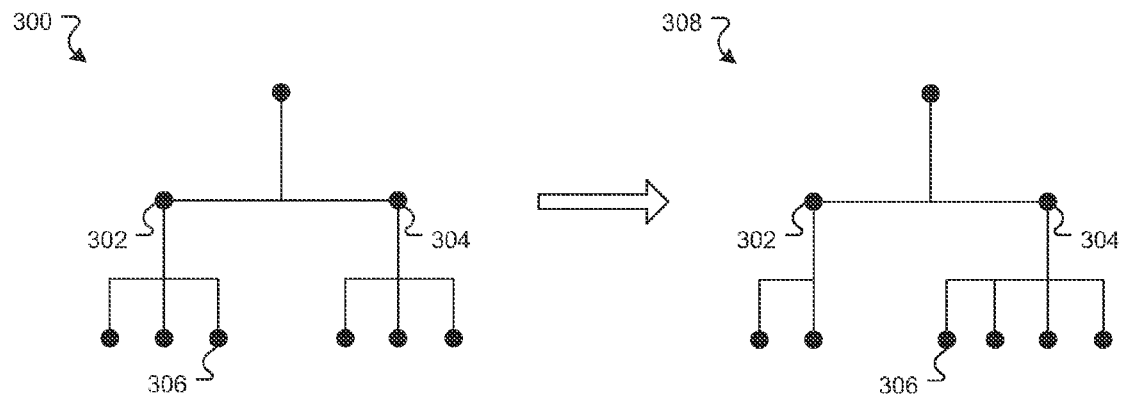
FIGS. 3A and 3B are schematic depictions of an exemplary virtual product hierarchy.
Figure 3B:
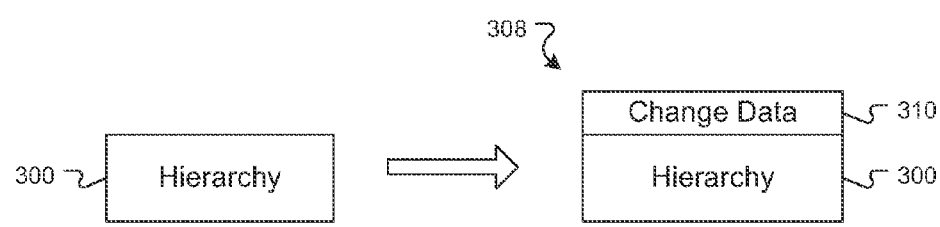

FIGS. 3A and 3B are schematic depictions of exemplary virtual product hierarchies. Referring to FIG. 3A, suppose a user is presented with a conventional product hierarchy 300. The product hierarchy 300 includes two product categories 302 and 304. Product category 302 includes a product 306. Suppose further that the user wants to move the product 306 from the category 302 to the category 304, as is shown in the hierarchy 308. As described above, one way to accomplish this is to create a new, conventional hierarchy 308 implementing the desired change.

FIG. 3B shows an implementation of a change used to create a virtual hierarchy 308. A virtual hierarchy 308 may include a conventional base hierarchy 300 together with change data 310. The change data 310 reflects changes desired by the user; e.g., moving a product from product category (e.g. category 302) to another category (e.g., category 304). In some implementations, the change data 310 reflects the desired changes in a syntax compatible with the underlying hierarchy and DBMS. More abstractly, change data 310 includes instructions for adding, deleting, or moving nodes in a hierarchy. Note that nodes need not be moved strictly laterally; rather, nodes can be moved up or down in the levels of a hierarchy, or placed in new levels of the hierarchy between previously-adjacent nodes.

In some implementations, the change data can be expressed as extensible markup language ("XML") instructions, relational database instructions, etc. More generally, the change data is expressed in a way that is consistent with how the hierarchy is expressed Such instructions (adding, deleting, or moving) are invertible. That is, each such instruction has a corresponding instruction that "undoes" the change. For example, the inverse of adding a node at a location in the hierarchy is deleting a node at the same location, and vice versa. Similarly, the inverse of moving a node from a first location to a second location is simply moving a node from the second location to the first location. As explained more fully below, this invertibility allows queries with respect to a virtual hierarchy to be translated to corresponding queries with respect to the underlying base hierarchy.

Although the change data 310 can be stored at any location—possibly even in the same file or files as the base hierarchy 300, the change data logically exists separately from the base hierarchy 300. Thus, the change data 310 can be thought of as a "markup" layer of data that exists on top of the base hierarchy 300 that permits a suitable tool (i.e., the user interface tool 208) to "render" changes described in the change data with respect to the base hierarchy. Among the advantages of this approach, using virtual hierarchies in this way preserves the data in the base hierarchy 300. Thus, creating a virtual hierarchy does not introduce additional data integrity or similar concerns with respect to the base hierarchy.

Figure 4:
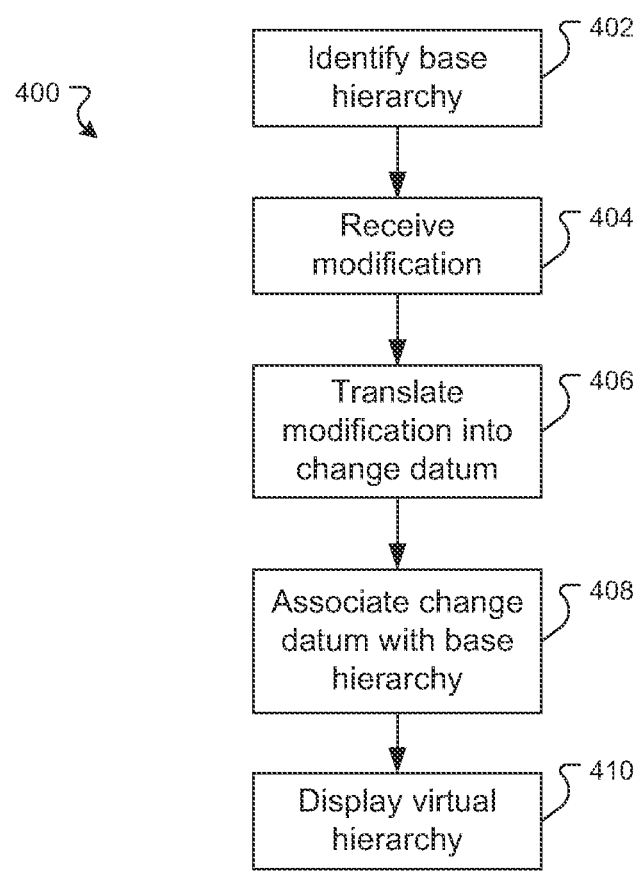
FIG. 4 is a flowchart for creating a virtual product hierarchy.

FIG. 4 is a flowchart for creating a virtual product hierarchy, according to the above discussion. In step 402, a base hierarchy is identified. In step 404, a desired modification is received. In some implementations, the desired modification is received via a user interface in which a user has specified the desired modification. For example, the user interface may include drag-and-drop functionality in which a user may add, delete, or move nodes in reference to a visual representation of the hierarchy.

In step 406, the desired modification is translated into a change datum. This step may include translating drag-and-drop instructions (or other instructions) into XML, SQL, or other commands consistent with the DBMS used by the virtual hierarchy system. In some implementations, this step is performed by the user interface tool 208.

In step 408, the change datum is associated with the base hierarchy, as discussed above in reference to FIG. 3B. In some implementations, this step is performed by the user interface tool 208. The association of the change datum and the base hierarchy can be accomplished in any known manner. For example, the association may be implemented by linking one or more files via a key, storing the change datum in a location that evinces the association (e.g., in a pre-defined directory in a file system), etc.

Sometimes (though not always), the order in which changes are received is significant. For example, a first change may create a new product category, and a second change may move a product from a previous category to the new category. Insofar as it is logically impossible to move a product to a category that does not yet exist, the order of these steps is significant. Thus, the order in which the changes are received is maintained when more than one change datum is received.

In step 410, the virtual hierarchy is displayed incorporating the modification received in step 404. In some implementations, this step involves rendering the "markup" described by the change datum. In some implementations, this step is performed by the user interface tool 208. If multiple change data are received, in some implementations, the change data are rendered in the order in which they were received.

Virtual hierarchies are useful not only to visualize the structure of an inventory, but also to help formulate analytic questions (e.g., database queries) with respect to the structure of the virtual hierarchy. However, a query with respect to a virtual hierarchy may provide misleading information (or may not even be well-formed) when considered as a query with respect to the underlying base hierarchy. For example, with respect to FIG. 3A, a query that involves aggregating performance data from the constituents of category 304 produces different answers if processed with respect to the base hierarchy 300 or the virtual category 308: the category 304 includes three products in the base hierarchy 300, but includes four products in the virtual category 308. The following techniques are useful for avoiding this problem.

Figure 5:
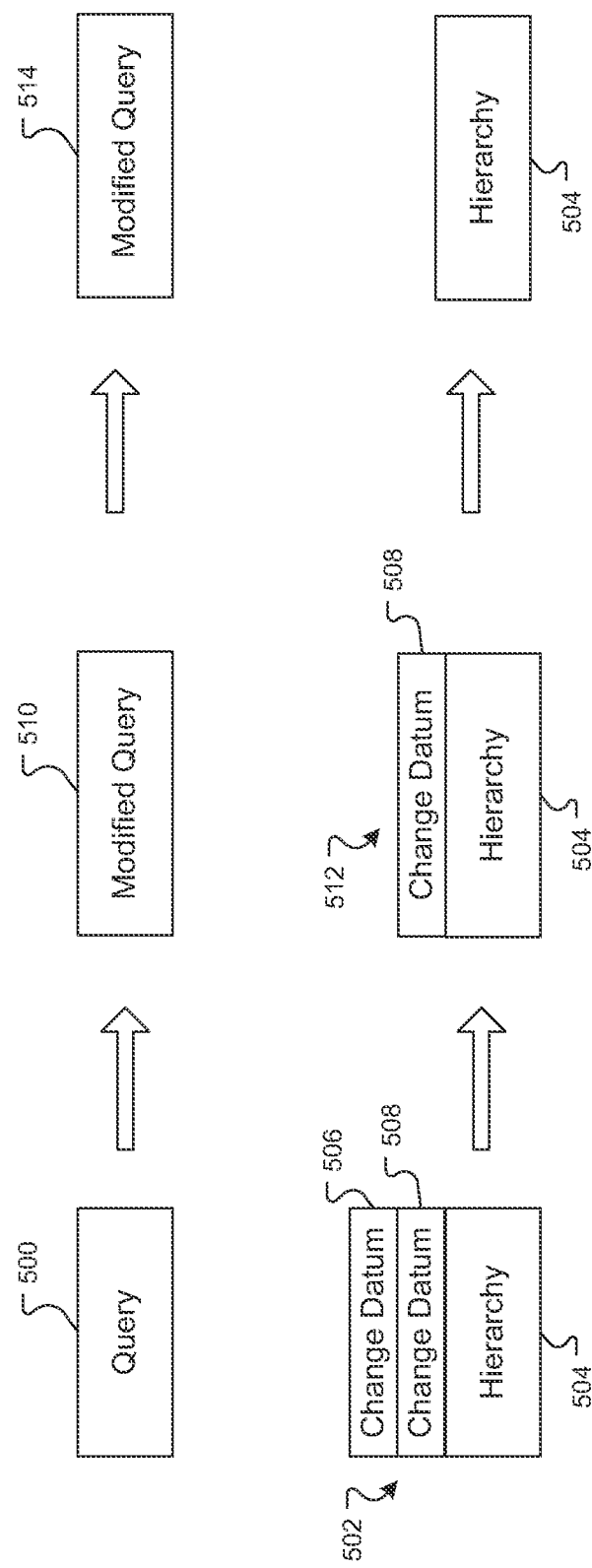
FIG. 5 is a schematic depiction of query handling with respect to a virtual hierarchy.
Figure 6:
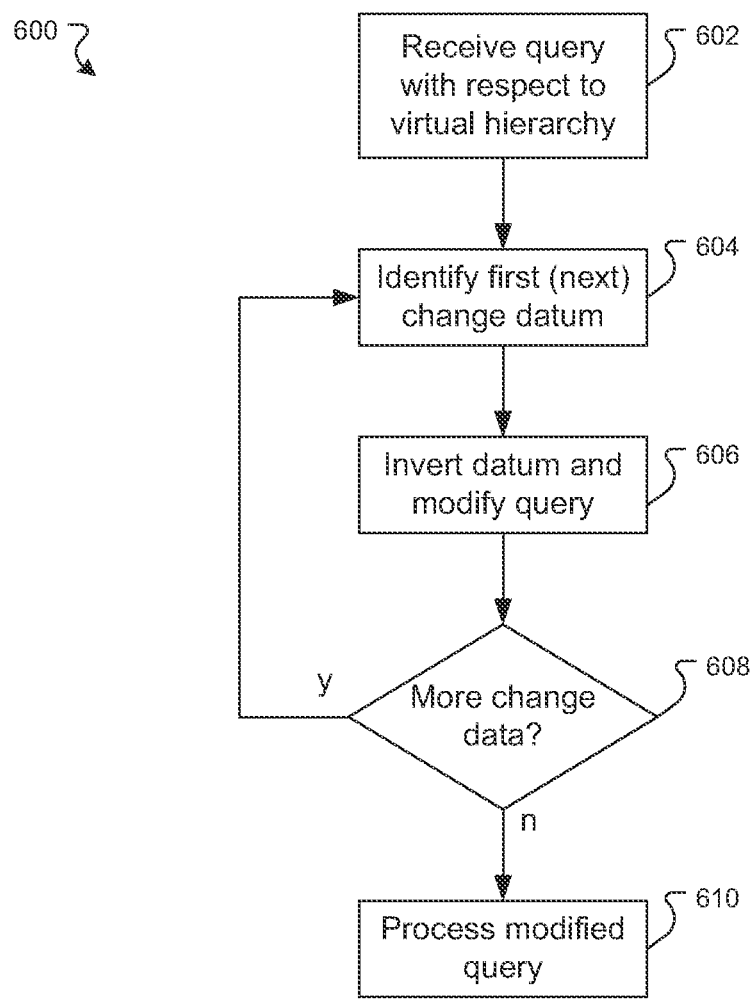
FIG. 6 is a flowchart for query handling with respect to a virtual hierarchy.

FIGS. 5 and 6 are schematic depiction and a flowchart, respectively, of query handling with respect to a virtual hierarchy. In FIG. 6, a query handling process 600 begins at step 602, where a query is received with respect to a virtual hierarchy. In FIG. 5, this is illustrated by the query 500 with respect to an exemplary virtual hierarchy 502 that includes a base hierarchy 504 and two changes 506 and 508.

In step 604, a first change datum is identified. In some implementations, the change data are identified in reverse order from how they were specified (e.g., in the process 400 of FIG. 4). In step 606, the identified change datum is inverted and the query appropriately modified. In this case, "appropriate" modification means the query is modified such that, when considered as a query with respect to the virtual hierarchy in which the change datum is inverted, the modified query provides the same results as the unmodified query provides with respect to the virtual hierarchy as it existed prior to the change identified in step 604.

When a change datum involves adding a node at a location, the corresponding inverse is deleting a node at that location. Thus, for such change data, the query is modified by excluding that node. For example, this may involve using a Boolean operator "AND NOT [data at that location]," or a logically equivalent operator.

Inversely, when a change datum involves deleting a node at a location, the corresponding inverse is adding a node at that location. Thus, for such change data, the query is modified by including that node. For example, this may involve using a Boolean operator "AND [data at that location]," or a logically equivalent operator.

Finally, change data that involves moving a node from one location to another can be decomposed into an addition and a deletion, and can be handled according to the above techniques.

Step 606 is shown schematically in FIG. 5. The initial query 500 with respect to virtual hierarchy 502 is transformed to a modified query 510 with respect to the virtual hierarchy 512. The transformation is carried out in step 606 by incorporating the change datum 506 into the query. Thus, the change datum 506 no longer appears in virtual hierarchy 512, having been accounted for by modifying the query.

As an example of step 606, suppose the received query involves aggregating performance data for nodes below the node 304 in the exemplary virtual hierarchy 308 of FIG. 3A. This includes performance data at node 306, which was initially moved from another location, and there is a change datum (not shown) describing this move.

In step 606 of FIG. 6, this query is "appropriately" modified to a query with respect to the base hierarchy 300 (FIG. 3A), in which performance data below node 304 is aggregated, along with performance data at node 306.

In decision 608, it is determined whether more change data exist. If so, those change data are iteratively identified and used to further modify the query, as in step 606. This is shown schematically in FIG. 5, where the modified query 510 is further modified into query 514, by incorporating the remaining change datum 508.

At the conclusion of the process 600, the final modified query is a query with respect to a traditional (i.e., non-virtual) hierarchy, that can be processed according to traditional database techniques. For example, in FIG. 5, the change data 506, 508 have been sequentially incorporated into a modified query 514 that ultimately can be processed with respect to the base hierarchy 504.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code stored in a non-transitory computer readable medium that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for querying data arranged in a base hierarchy using a virtual hierarchy related to the base hierarchy through a plurality of change data, the method comprising:

storing the base hierarchy and the plurality of change data in a database management system, wherein each item of change data includes an instruction to add, delete, or move a node between the base hierarchy and the virtual hierarchy, wherein each item of change data is an invertible instruction with a corresponding instruction that undoes the change, and wherein an order of the change data is maintained for a plurality of items of change data;

displaying the virtual hierarchy in a display of a computer based on an application of the change data to the base hierarchy;

receiving a query in a user interface to the database management system with respect to the virtual hierarchy;

for each change datum in the plurality of change data, identifying a corresponding inverse, thereby identifying a plurality of inverses;

using the plurality of inverses, determining a modified query with respect to the base hierarchy, wherein the query with respect to the virtual hierarchy and the modified query with respect to the base hierarchy have an identical result;

performing the modified query on the base hierarchy using the database management system, wherein the plurality of change data are arranged in an order and the modified query is determined by iteratively applying the plurality of inverses to the query in a reverse of the order; and presenting a result of the modified query as a query result for the query against the virtual hierarchy.

2. The method of claim 1 wherein the plurality of change data include adding a node at a specified location, and wherein the corresponding inverse includes deleting the node from the specified location.

3. The method of claim 1 wherein the plurality of change data include deleting a node at a specified location, and wherein the corresponding inverse includes adding the node at the specified location.

4. The method of claim 1 wherein the plurality of change data include moving a node from an initial location to a destination location, and wherein the corresponding inverse includes moving the node from the destination location to the initial location.

5. The method of claim 1 further comprising displaying a result of the modified query against the base hierarchy as a result of the query against the virtual hierarchy.

6. A computer program product comprising computer executable code embodied in a non-transitory computer readable medium that, when executing on one or more computing devices, queries data arranged in a base hierarchy using a virtual hierarchy related to the base hierarchy through a plurality of change data by performing the steps of:

storing the base hierarchy and the plurality of change data in a database management system, wherein each item of change data includes an instruction to add, delete, or move a node between the base hierarchy and the virtual hierarchy, wherein each item of change data is an invertible instruction with a corresponding instruction that undoes the change, and wherein an order of the change data is maintained for a plurality of items of change data;

displaying the virtual hierarchy in a display of a computer based on an application of the change data to the base hierarchy;

receiving a query in a user interface to the database management system with respect to the virtual hierarchy;

for each change datum in the plurality of change data, identifying a corresponding inverse, thereby identifying a plurality of inverses;

using the plurality of inverses, determining a modified query with respect to the base hierarchy, wherein the query with respect to the virtual hierarchy and the modified query with respect to the base hierarchy have an identical result;

performing the modified query on the base hierarchy using the database management system, wherein the plurality of change data are arranged in an order and the modified query is determined by iteratively applying the plurality of inverses to the query in a reverse of the order; and presenting a result of the modified query as a query result for the query against the virtual hierarchy.

7. The computer program product of claim 6 wherein the plurality of change data include adding a node at a specified location, and wherein the corresponding inverse includes deleting the node from the specified location.

8. The computer program product of claim 6 wherein the plurality of change data include deleting a node at a specified location, and wherein the corresponding inverse includes adding the node at the specified location.

9. The computer program product of claim 6 wherein the plurality of change data include moving a node from an initial location to a destination location, and wherein the corresponding inverse includes moving the node from the destination location to the initial location.

10. The computer program product of claim 6 further comprising code that performs the step of displaying a result of the modified query against the base hierarchy as a result of the query against the virtual hierarchy.

11. A system comprising:
a processor;
a database management system storing a base hierarchy and a plurality of change data, wherein each item of change data includes an instruction to add, delete, or move a node between the base hierarchy and a virtual hierarchy, wherein each item of change data is an invertible instruction with a corresponding instruction that undoes the change, and wherein an order of the change data is maintained for a plurality of items of change data;

a device displaying a virtual hierarchy based on an application of a plurality of change data to the base hierarchy; and memory bearing instructions that, when executed, cause the processor to receive a query in a user interface to the database management system with respect to the virtual hierarchy, for each change datum in the plurality of change data, to identify a corresponding inverse, thereby identifying a plurality of inverses, using the plurality of inverses, to determine a modified query with respect to the base hierarchy, wherein the query with respect to the virtual hierarchy and the modified query with respect to the base hierarchy have an identical result, to perform the modified query on the base hierarchy using the database management system wherein the plurality of change data are arranged in an order and the modified query is determined by iteratively applying the plurality of inverses to the query in a reverse order, and to present a result of the modified query as a query result for the query against the virtual hierarchy.

12. The system of claim 11 wherein the plurality of change data includes adding a node at a specified location, and wherein the corresponding inverse includes deleting the node from the specified location.

13. The system of claim 11 wherein the plurality of change data includes deleting a node at a specified location, and wherein the corresponding inverse includes adding the node at the specified location.

14. The system of claim 11 wherein the plurality of change data includes moving a node from an initial location to a destination location, and wherein the corresponding inverse includes moving the node from the destination location to the initial location.

* * * * *